United States Patent [19]

Okai et al.

[11] Patent Number: 4,700,402

[45] Date of Patent: * Oct. 13, 1987

[54] INPUT METHOD FOR GRAPHIC PATTERN DATA

[75] Inventors: Tsukasa Okai; Shuichi Araki, both of Kyoto, Japan

[73] Assignee: Dainippon Screen Seizo Kabushiki Kaisha, Kyoto, Japan

[*] Notice: The portion of the term of this patent subsequent to Apr. 23, 2002 has been disclaimed.

[21] Appl. No.: 519,727

[22] Filed: Aug. 2, 1983

[30] Foreign Application Priority Data

Sep. 14, 1982 [JP] Japan .................................. 57-159878

[51] Int. Cl.⁴ .............................................. G06K 9/36
[52] U.S. Cl. ...................................... 382/56; 358/260; 382/21
[58] Field of Search ....................... 382/20, 21, 22, 60; 358/260

[56] References Cited

U.S. PATENT DOCUMENTS 3,987,412 10/1976 Morrin, II ............................. 382/21
4,097,847 6/1978 Forsen et al. ......................... 382/22

Primary Examiner—Leo H. Boudreau
Attorney, Agent, or Firm—Hayes, Davis & Soloway

[57] ABSTRACT

Method of inputting digitalized, two value graphic pattern data of a character or a symbol into a memory device wherein, for the purpose of compressing the data representative of complicated graphic patterns of characters and symbols, the contour line of a graphic pattern is traced from a start point which may be selected from the intersections of the contour line with a reference line drawn across the graphic pattern, and the positional data of sampling points arranged along the contour line is sequentially detected along the contour line from the start point. Since the start point may be definitely selected from each contour line even when the graphic pattern is comprised of a plurality of closed-loop contour lines by drawing a necessary number of lines across the graphic pattern, the graphic pattern may be accurately represented by the coordinate values of the sampling points, arranged along the contour lines, without fail.

5 Claims, 4 Drawing Figures

INPUT METHOD FOR GRAPHIC PATTERN DATA

This invention relates to a method of inputting digitalized, two-value graphic pattern data of a character or a symbol into a memory device, and in particular such a method which allows automatic tracing of all the contour lines appearing on each character without fail.

The present invention has a great utility particularly in a computer-controlled photo-type-setting. A computer-controlled photo-type-setting machine is a device for recording documents by storing a large number of graphic patterns of characters and symbols electronically and using them as needed for controlling a recording means, as opposed to a conventional photo-type-setting machine which optically project and photographically exposes character patterns depicted on an original plate onto the surface of a photosensitive material by way of an optical lens system. For such a computer-controlled photo-type-setting machine to be of practical utility, it is necessary to store the graphic patterns of all the characters and symbols which may appear in the object documents without omission. This in turn causes a need for an extremely large memory device, in particular, when Japanese or Chinese documents are to be recorded or produced with the machine since Japanese or Chinese documents are normally comprised of thousands of different kanjis (Chinese characters).

As a technique for digitalizing a graphic pattern and storing it in a memory device, it is known, for instance, to divide each character pattern regions into a large number of minute pixels and to store the state of each pixel as a two-value signal depending on whether the pixel is black (graphic line portion) or white (non graphic line portion).

However, to maintain the quality of reproduced picture images, it is necessary to select the size of each pixel as small as possible and enhance the resolution power. On the other hand, increase in the number of pixels means a need for an increased memory capacity and, hence, an increase in the volume of the work and the costs involved in inputting data.

The data compression technique known as the run length method has the shortcoming of inefficient compression capability, with its compression efficiency ranging from 30 to 40%..

Particularly in conjunction with kanjis (Chinese characters) which are commonly used in Japan, since they are comprised of many complicated elements and are great in their number as compared with Roman alphabet, each character must be divided into a large number of pixels and the capacity of the memory and the volume of work required in storing data to cover all the necessary character fonts are so great that this fact is considered to be a major reason for the delay in the development and popularization of computer-controlled photo-type-setting in Japan.

A primary object of this invention is to provide a method for inputting graphic pattern data into a memory device which can greatly compress the data to be stored without damaging the quality of reproduced picture images.

The method of this invention is based on the recognition that the contour line of a graphic pattern which is expressed by a two-value signal may be comprised of one or more closed-loop lines and, according to the method of this invention, a reference point is selected on each contour line and the contour line is traced from the reference point and the coordinate values of necessary points along the contour line detected in the course of tracing the contour line are inputted into and stored in a memory device as the data of the graphic pattern.

According to the method of this invention, the above mentioned objects may be accomplished by providing a method of inputting digitalized, two-value graphic pattern data of a character or a symbol into a memory device, characterized by that the contour line of the graphic pattern is traced from a start point arranged on the contour line, and the positional data of the sampling points detected in the course of the tracing of the contour line is sequentially stored in the memory device as a graphic pattern data.

Other objects and features of this invention will become better understood through a consideration of the following description taken in conjunction with the appended drawings in which.

First, a graphic pattern region which is to be stored is finely divided by a grid into pixels and the data of each pixel is stored in a memory device as a two-value signal. This is similar to what is done in conventional methods. However, according to the method of this invetion, the whole stored data is not served for use as the accumulated data for a computer-controlled photo-type-setting machine but only the portion of the data which is necessary for reproducing and recording the concerned character or the like is extracted from the stored data.

Next, those pixels located on the contour line of the picture image pattern are selected from the totality of the pixels. This is done by comparing the data of a pixel with that of adjacent ones as illustrated in FIG. 2.

Figure 1:
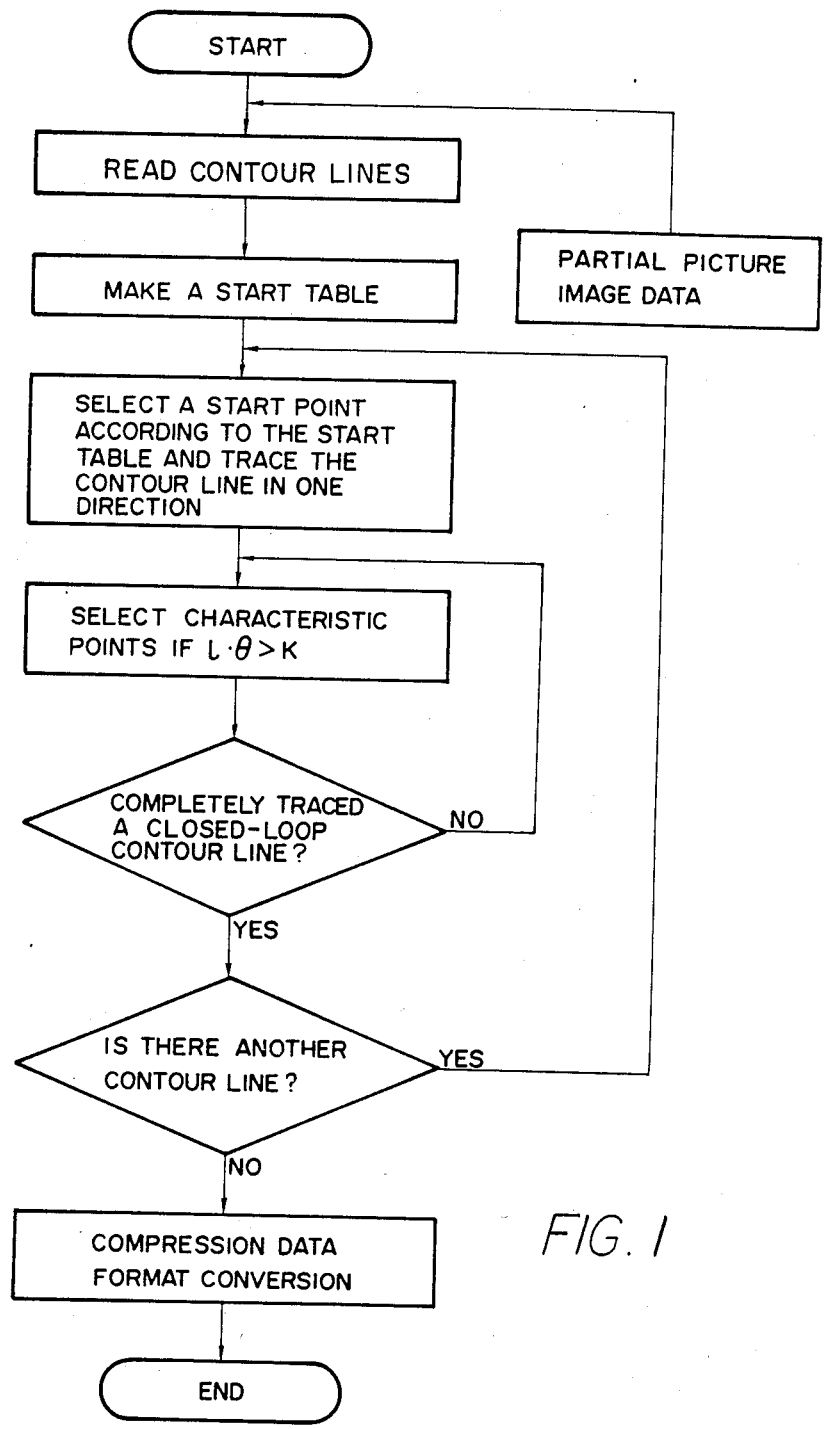
FIG. 1 is a flowchart depicting the steps for reading and compressing graphic pattern data according to the method of this invention.
Figure 2A:
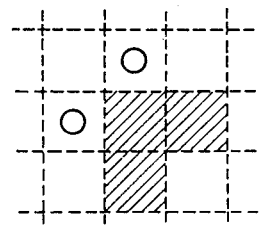
FIG. 2 are illustrative views showing a manner of selecting pixels located along a contour line.
Figure 2B:
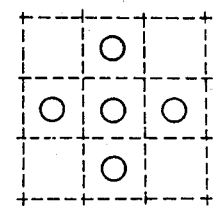

In FIG. 2, with the hatched pixels and those denoted by a small circle assumed as black (graphic line portion) and white (non graphic line portion), respectively, when the data of one or more pixels adjacent to a central pixel is different from that of the central pixel as shown in FIG. 2 (A), the central pixel is determined as being located on the contour line, and, when the data of all the adjacent pixels adjacent to a central pixel is the same as that of the central pixel as shown in FIG. 2 (B), then the central pixel is determined as being off the contour line. There are eight such adjacent pixels around the central pixel including those on diagonal corners, but using only four of the adjacent pixels located to the right and left of, above and below the central pixel in such a determination process is sufficient for most practical applications.

A start point is selected on the thus detected contour line. This is done by defining table lines $l_1, l_2, \ldots$ so that they run across the contour lines in the graphic pattern region and one of such intersections is selected as the start point.

Figure 3:
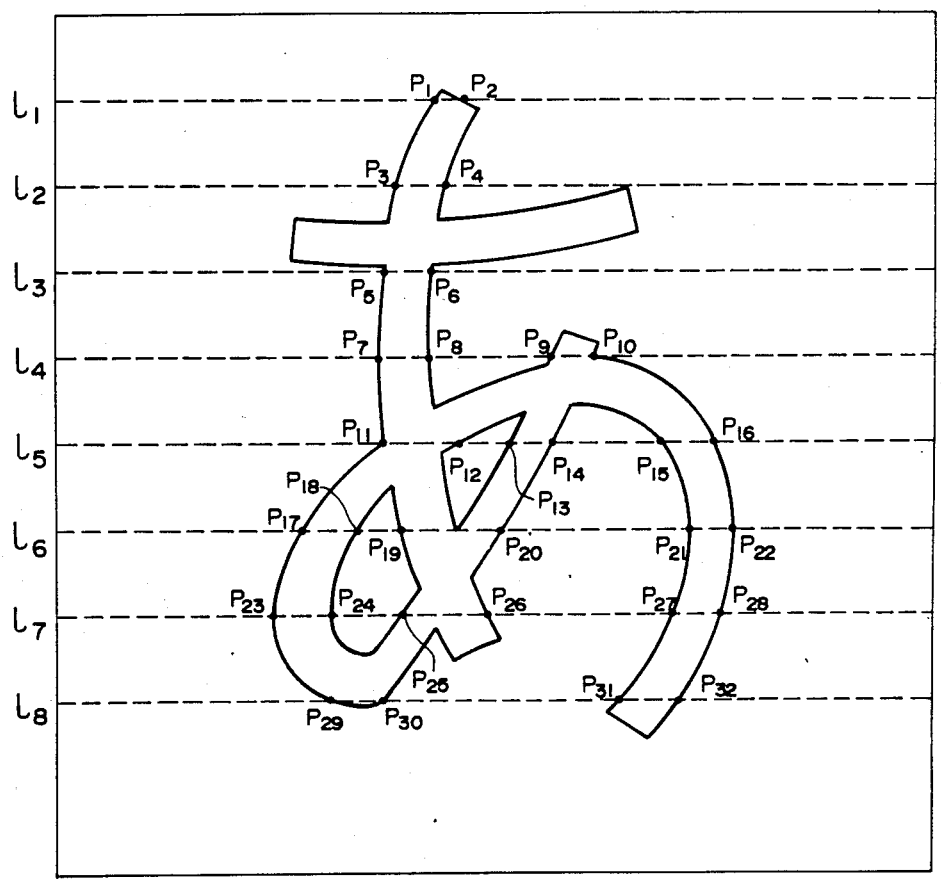
FIG. 3 is a schematic view of a pattern table according to the method of this invention.

If the graphic pattern can be formed by only one closed-loop line (as in the cases of hiraganas (Japanese alphabet) " さ " and " い " and Roman alphabet "H" and "E"), one such table line suffices, but, generally, a plurality of table lines are defined as shown in FIG. 3 in such a manner that the intervals between the table lines may be smaller than the smallest loop of all the closed-loop line formed by a plurality of contour lines. By this way, the data of all the contour lines may be detected without omission.

And a directivity and an order of priority are given to each of these table lines. For instance, in the case shown in FIG. 3, each table line has a directivity heading from the left end to the right end and the upper ones have higher priority than lower ones, in the order of $l_1$, $l_2$, Thereafter, a succeeding order is given to each of the intersections defined by the table lines and the contour lines according to the mentioned directivity and order of priority. In other words, in the case shown in FIG. 3, the succeeding order of the intersections is expressed by $P_1$ and $P_2$ on the table line $l_1$, $P_3$ and $P_4$ on the table line $l_2$ and so on, in that order.

According to the method of this invention, a table in which the intersections of the contour lines with the table lines are each designated with a succeeding order is called as a "start table".

The first intersection of the first succeeding order ($P_1$ in this embodiment) is selected from all the intersections as a first start point and the contour line is traced from that start point in one direction. The direction of this tracing is selected in advance so that the black region (graphic line portion) is always located to the right (or the left) of the contour line that is being traced.

When the contour line is traced with the point $P_1$ selected as a start point and in such a direction that the black region is located always to the right, it amounts to that the contour line is traced clockwise in the order of $P_2$, $P_4$, $P_6$, $P_8$, . . . When the interior of the closed-loop line defined by the contour line is a black region, the direction of tracing the contour line is clockwise as indicated above, but, conversely, when the exterior of the closed-loop is a black region, then the contour line is traced counter-clockwise (as is the case with the contour lines including $P_{12}$ and $P_{13}$, and $P_{18}$, $P_{19}$, $P_{24}$ and $P_{25}$).

The coordinate values of the pixels located on the contour lines are thus inputted and stored in a memory device in a sequential manner according to the start points and the tracing directions as described above, but, in actual work, the data of all the pixels located on the contour lines is not absolutely necessary.

For instance, in the portion of the contour line which is along a straight line, this straight line may be identified by giving only the coordinate value of the pixels on the two ends of this straight line, and, even in the case of a curved portion, there is no inconvenience if the curved portion is approximated by straight line segments defined by connecting representative points selected along the contour line at appropriate pitches according to the curvature of the contour line and this allows a considerable compression in the volume of information that is to be stored in the memory device without any sacrifice on the practicality of the process.

However, in carrying out the work of inputting the graphic pattern data of a large number of characters and symbols, manual work which largely depends on the judgement of the worker causes mental fatigue but also possible errors in the determination of appropriate points due to his misjudgement. Therefore, it is desirable to make use of a certain automatic means for selecting appropriate representative points along the contour line.

In carrying out the method of this invention, it is desirable to make use of the following technique. This technique is disclosed in another Japanese Patent application by the same inventors under the title of "Method of Data Compression" (Japanese Ser. No. 57-159226 filed Sept. 13, 1982 corresponding to U.S. Ser. No. 514,673 filed July 18, 1983, now U.S. Pat. No. 4,513,444 issued Apr. 23, 1985) and its detailed description is omitted here with only an outline thereof given hereunder.

The gist of the invention disclosed in this patent application exists in selecting a sampling point from a plurality of sampling points arranged along the contour line of a graphic pattern only when the product of the length $l$ of a line segment connecting the sampling point with a following sampling point and the angle $\theta$ defined by this line segment and a preceding line segment is greater than a predetermined constant value K and otherwise disregarding the sampling point as unnecessary information.

In other words, by determining whether the line segments obtained by connecting the sampling points in a sequential manner satisfy the condition that $l \times \theta > K$ or not, it is decided whether the coordinate value of each particular sampling point is to be stored in a memory device as necessary information or disregarded as unnecessary information so that the information to be stored may be efficiently compressed.

A primary advantage of this technique which makes use of the relationship $l \times \theta > K$ as a reference for selecting each representative point exists in that the intervals between representative points may be appropriately selected according to the curvature of the contour line. In other words, when the curvature of the contour line is great, since the angle $\theta$ defined by two adjacent line segments is small, the length $l$ becomes great to satisfy the relationship $l \times \theta > K$ and the interval between the two sampling points becomes great. On the other hand, when the curvature of the contour line is small, since the angel $\theta$ is great, the length becomes accordingly small so that the interval between the sampling points become small and relatively accurate approximation with straight lines becomes possible.

Thus, representative points are sequentially selected according to the reference standard based on the relationship $l \times \theta > K$ with start point $P_1$ selected as a start point and the contour line is completely traced while the coordinate values of each representative point selected along the contour line is inputted and stored in a memory device.

Then, the data of the intersections $P_1$, $P_2$, $P_4$, $P_6$, $P_8$, $P_9$, $P_{10}$, $P_{16}$, $P_{22}$, $P_{28}$, $P_{32}$, $P_{31}$, $P_{27}$, $P_{21}$, $P_{15}$, $P_{14}$, $P_{20}$, $P_{26}$, $P_{30}$, $P_{29}$, $P_{23}$, $P_{17}$, $P_{11}$, $P_7$, $P_5$ and $P_3$ shown in FIG. 3 is either stored in the memory device as necessary information or disregarded as unnecessary information as these representative points are located on the contour line starting from the point $P_1$, in the process of storing the data of all these sampling points.

At this stage, any unprocessed intersection is searched for and the representative point of the highest priority, $P_{12}$ in the case shown in FIG. 3, is selected.

So, by selecting the point $P_{12}$ as a new start point, the contour line is again traced as described previously and representative points are selected so that their coordinate values may be stored in the memory device. In this case, the contour line including the points $P_{12}$ and $P_{13}$ is traced. Since the exterior of the closed-loop contour line is a black region, the contour line is traced counter-clockwise so that the black region is always located to the right as is obvious from the previous description.

Then, any further unprocessed intersections are searched for and the representative point of the highest priority of all the remaining representative points is selected as a start point so that the contour line including $P_{18}$, $P_{24}$, $P_{25}$ and $P_{19}$ may be traced and the coordinate values of the representative points along this contour line are stored.

In the example shown in FIG. 3, data storage is thus completed with respect to the data of all the contour lines, and, even when the character happens to be a one which is more complicated in configuration having more basic elements, simply repeating the above-mentioned procedure over the number of times corresponding to the number of the closedloop contour lines which make up the particular character allows the data of all the contour lines to be stored without omission.

As described above, according to the method of the present invention, it is possible to extremely efficiently store the data of graphic patterns which may be represented by two-value signals such as characters and symbols through proper selection of the intervals between representative points according to the curvature of the contour line. The method of this invention is thus capable of controlling the volume of information to be stored in an extremely accurate manner and, with other advantages, the method of this invention has a high level of practicality.

The invention is disclosed herein in connection with embodiments of the same, but it will be understood that these are intended to be illustrative only and that various changes may be made in the construction and arrangement of the various parts, as well as the steps of the method, within the spirit of the invention and the scope of the appended claims.

What is claimed is:

1. Method of inputting digitalized, two value graphic pattern data of a character or a symbol into a memory device, characterized by that:

the contour line of the graphic pattern is traced from a start point selected from a plurality of sampling points arranged on the contour line, and the positional data of the sampling points detected in the course of the tracing of the contour line is analyzed, each sampling point is compared to see if it satisfies the requirement that $l \cdot \theta > \kappa$, wherein $l$ is the length of a line segment connecting the sampling point with a following sampling point, $\theta$ is the angle defined by this line segment and a preceding line segment and $\kappa$ is a predetermined constant, and the sampling point is sequentially stored in the memory device as a graphic pattern data if it satisfies the equation.

2. Method as defined in claim 1, wherein one contour line is selected in each contour line when the graphic pattern is comprised of a plurality of contour lines.

3. Method as defined in claim 2, wherein at least one table line is drawn across the graphic pattern and the start point is defined as an intersection of the contour line with the table line.

4. Method as defined in claim 3, wherein a plurality of table lines are drawn across the graphic pattern in such a manner that the table lines are substantially parallel to one another and the intervals between the table lines are smaller than a minimum diameter of the loops defined by the contour lines.

5. Method as defined in claim 4, wherein each table line is assigned with a directivity and an order of priority and the intersections of the table lines with the contour lines are sequentially detected according to the directivity and the order of priority in such a manner that each contour line is traced from a first intersection as a start point and a next intersection is selected upon completion of the tracing of the previous contour line, the intersections encountered in the course of the tracing of the contour lines being disregarded and the next start point being selected from the intersection which has not been traced yet and has the highest order of priority.

* * * * *